United States Patent [19]

Houtz et al.

[11] Patent Number: 4,589,188

[45] Date of Patent: May 20, 1986

[54] TERMINAL PIN STRIP SEPARATOR

[75] Inventors: Timothy W. Houtz, Etters; Charles M. Lovendusky, Enola, both of Pa.

[73] Assignee: E. I. Du Pont de Nemours and Company, Wilmington, Del.

[21] Appl. No.: 715,969

[22] Filed: Mar. 25, 1985

[51] Int. Cl.[4] .............................................. B37D 37/12
[52] U.S. Cl. .................................. 29/566.2; 29/564.6; 29/747; 409/257; 409/270; 409/281
[58] Field of Search ............... 29/33 M, 564.1, 564.2, 29/564.3, 564.6, 566.1, 566.2, 741, 747, 835, 863, 76 R, 76 A, DIG. 15, 583; 83/647; 409/250, 252, 256, 257, 258, 269, 271, 277, 278, 276, 279, 280, 281

[56] References Cited

U.S. PATENT DOCUMENTS

| | | | |
|---|---|---|---|
| 259,928 | 6/1882 | Scherer | 83/632 X |
| 1,233,373 | 7/1917 | Lapointe | 409/278 |
| 1,425,894 | 8/1922 | Pitrus | 83/647 X |
| 1,648,008 | 11/1927 | Selby et al. | 30/394 |
| 1,751,672 | 3/1930 | Westdahl | 83/647 |
| 1,776,173 | 9/1930 | Sinclair | 83/647 X |
| 2,630,148 | 3/1953 | Ferguson | 30/393 |
| 3,078,559 | 2/1963 | Thomas | 29/583 |
| 3,109,234 | 11/1963 | Shellick et al. | 29/583 X |
| 3,237,281 | 3/1966 | Antonson | 29/583 X |
| 3,537,351 | 11/1970 | Eck | 83/647 |
| 3,783,488 | 1/1974 | Ragard et al. | 29/741 X |
| 4,099,316 | 7/1978 | Morgan et al. | 29/566.2 |
| 4,293,999 | 10/1981 | Woodman, Jr. | 29/566.2 X |
| 4,409,733 | 10/1983 | Alemanni | 29/564.3 X |

FOREIGN PATENT DOCUMENTS 246312 12/1946 Switzerland ........................ 29/76 R

*Primary Examiner*—Z. R. Bilinsky
*Assistant Examiner*—Glenn L. Webb

[57] ABSTRACT

Terminal pin strips including transverse metal terminal pins embedded in and spaced along the length of a thermoplastic bar are subdivided or separated into predetermined lengths by means of a longitudinal blade having skiving edges which skive progressively deeper into the bar during a single reciprocation of the blade.

22 Claims, 9 Drawing Figures

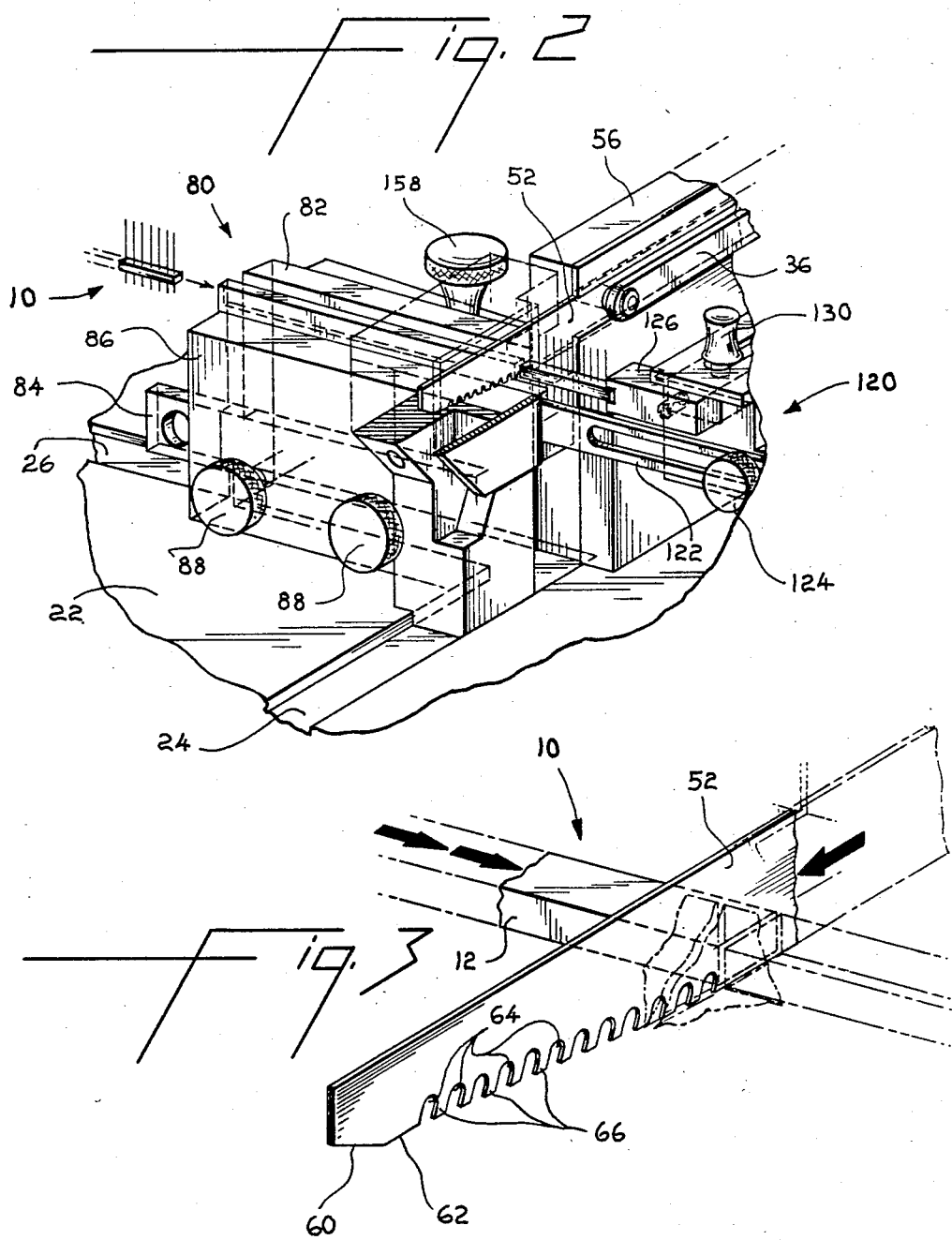

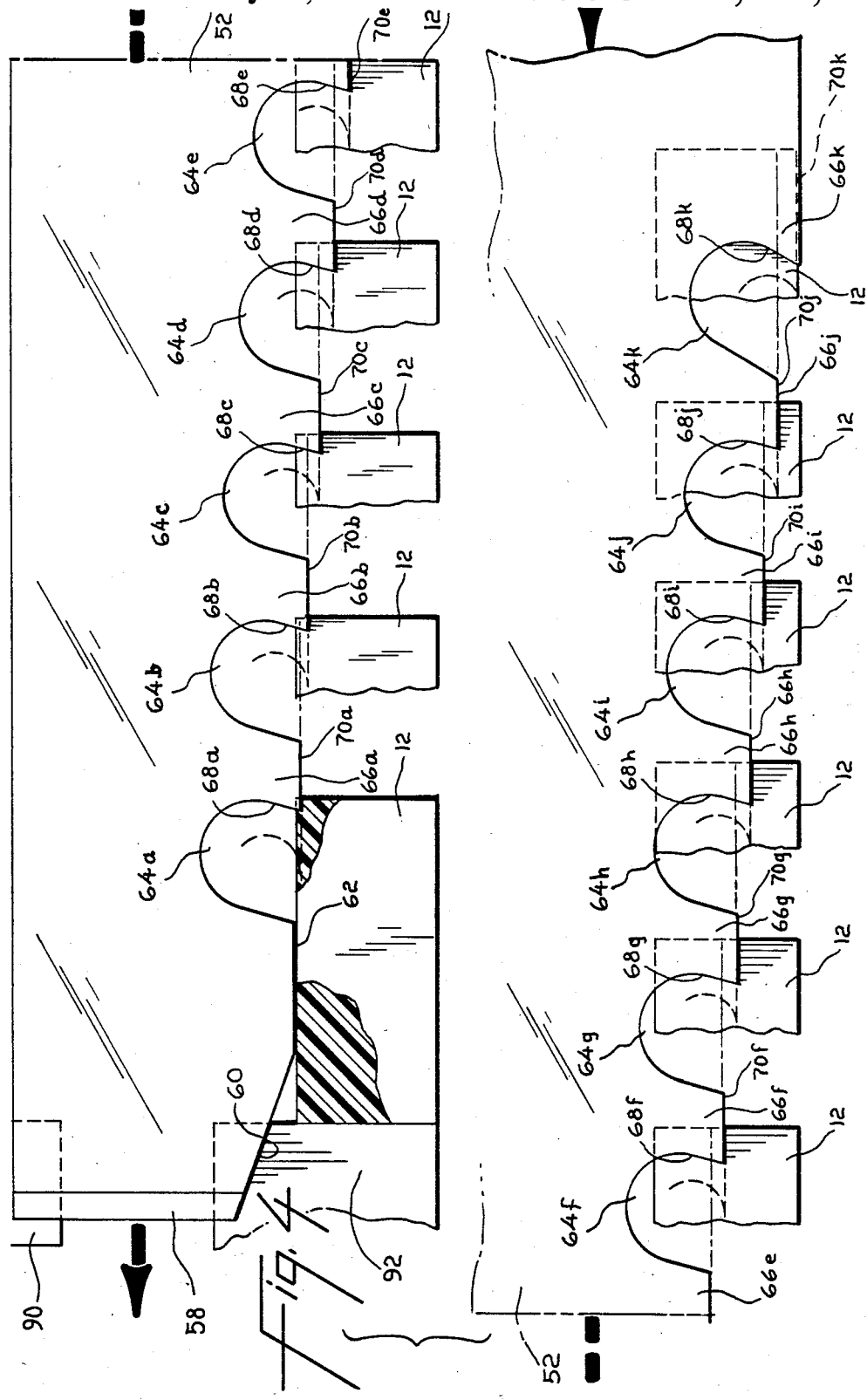

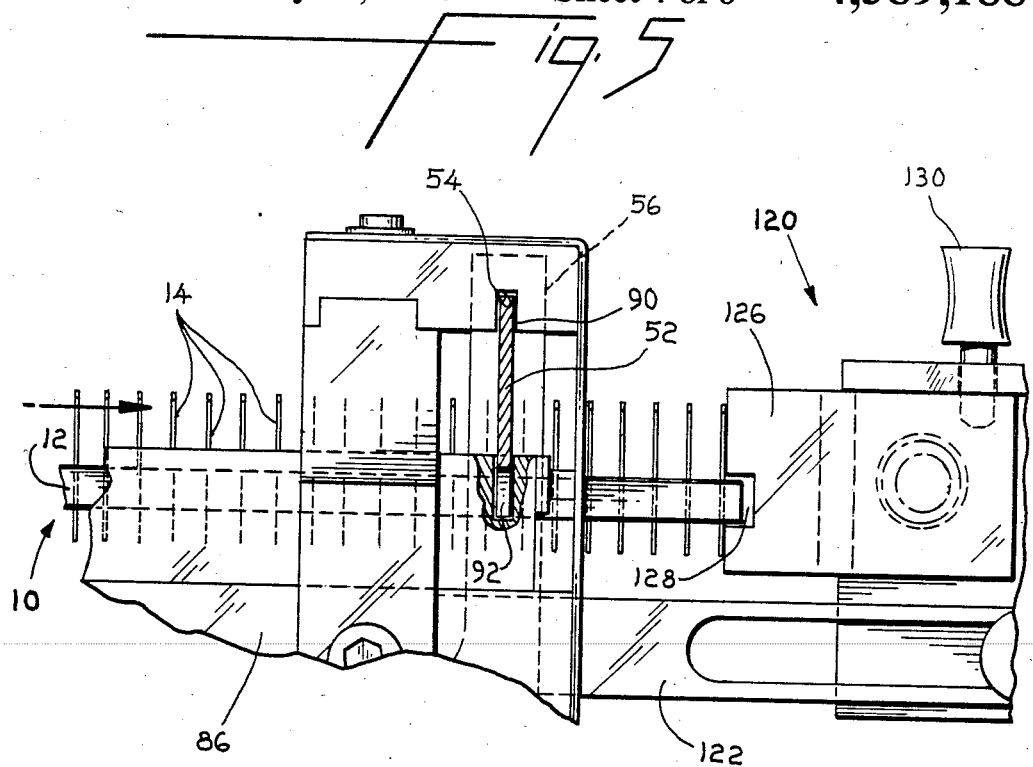

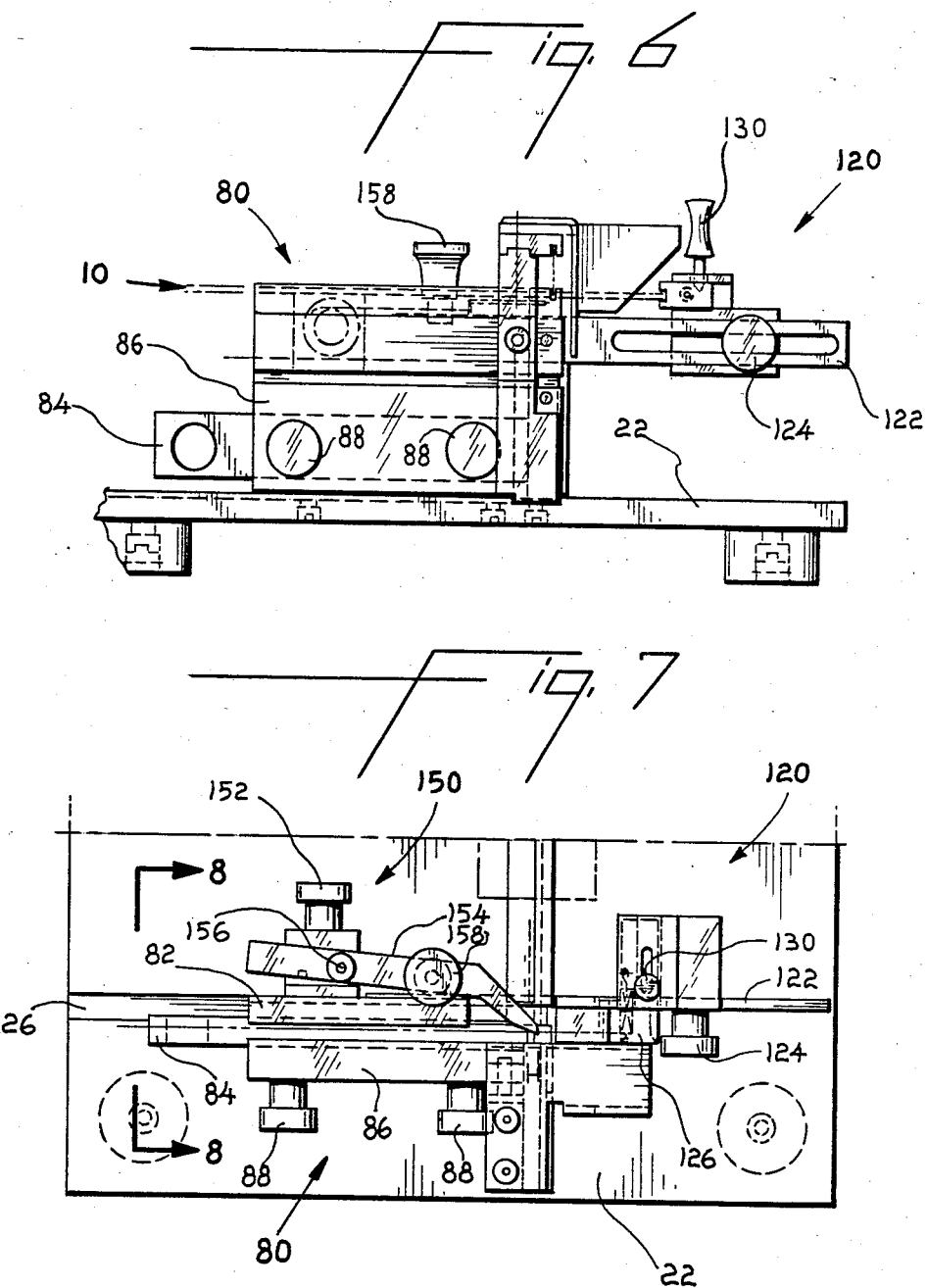

4,589,188

TERMINAL PIN STRIP SEPARATOR

BACKGROUND OF THE INVENTION

This invention relates to apparatus for subdividing strips or "sticks" of printed circuit board terminal pins into predetermined lengths.

Printed circuit board terminal pins are frequently fabricated as parallel, laterally spaced metal pins embedded in a longitudinal bar of thermoplastic material such as nylon. The longitudinal axes of the terminal pins are typically perpendicular to the longitudinal axis of the thermoplastic bar. The ends of the terminal pins project from the top and bottom of the bar to allow other circuit elements to make electrical contact with the pins. The cross sectional dimensions of the bar, the spacing of the pins, and the amount and direction of projection of the pins depend on the intended application of the terminal pin assembly.

The strips are typically fabricated in lengths much greater than the lengths of the assemblies to be used. It is therefore necessary to subdivide the originally fabricated strips into the desired finished lengths. This has typically been done by such apparatus as high speed rotary saw blades or by tools which break off desired terminal pin strip lengths. The prior art apparatus has a number of deficiencies, including the production of finished pieces having ends which are burred and otherwise irregular. Such finished pieces have poor appearance and may be difficult to use. For example, burred ends may interfere with the end-to-end stackability of the pieces and may also prevent proper assembly of the pieces with other electrical circuit components. Burrs may also break off from the pieces and contaminate associated electrical circuitry.

It is therefore an object of this invention to provide improved apparatus for separating terminal pin strips into finished lengths.

It is another object of the invention to provide terminal pin assembly separating apparatus which can accommodate terminal pin assemblies of various shapes and sizes, and which can subdivide such assemblies into various lengths.

It is still another object of this invention to provide terminal pin assembly separating apparatus which can subdivide such assemblies with a high degree of precision and repeatability and with little or no burring or other undesirable deformation of the thermoplastic bar.

SUMMARY OF THE INVENTION

These and other objects of the invention are accomplished in accordance with the principles of the invention by apparatus through which a terminal pin assembly can be pushed for transverse separating or broaching into predetermined lengths by a reciprocating skiver blade having a succession of skiving edges, each of which skives progressively farther into the thermoplastic bar of the assembly until the bar is completely broached. The apparatus guides and supports the terminal pin assembly on both sides of the axis of reciprocation of the skiver blade. The apparatus also guides and supports the skiver blade on both sides of the terminal pin asssembly. In this way a high degree of precision is maintained with respect to the location at which the terminal pin assembly is broached, and the amount of burring or other deformation of the assembly is reduced. The shape of the skiver blade allows the apparatus to skive all the way through the terminal pin assembly with a single unidirectional stroke of the skiver blade. This, and the manner in which the skiver blade skives progressively deeper into the thermoplastic bar, also reduces burring and other deformation of the assembly. The apparatus is readily adjustable to accommodate terminal pin assemblies of various sizes and shapes, and to separate those assemblies into various finished lengths.

Further features of the invention, its nature and various advantages will be more apparent from the accompanying drawings and the following detailed description of the invention.

BRIEF DESCRIPTION OF THE DRAWINGS

FIG. 2 is an enlarged, partly sectional, perspective view of a portion of the apparatus of FIG. 1.

FIG. 3 is a detailed perspective view of the skiver blade in the apparatus of FIGS. 1 and 2.

FIG. 4 is an elevational view of the skiver blade of FIG. 3. The terminal pin assembly being separated is shown adjacent each skiving edge to illustrate the effect of each successive skiving edge on the terminal pin assembly.

FIG. 5 is a partial end view of the apparatus of FIGS. 1–4.

FIG. 6 is another end view of the broaching end of the apparatus of FIGS. 1–5.

FIG. 7 is a plan view of the broaching end of the apparatus of FIGS. 1–6.

DETAILED DESCRIPTION OF THE INVENTION

Figure 9:
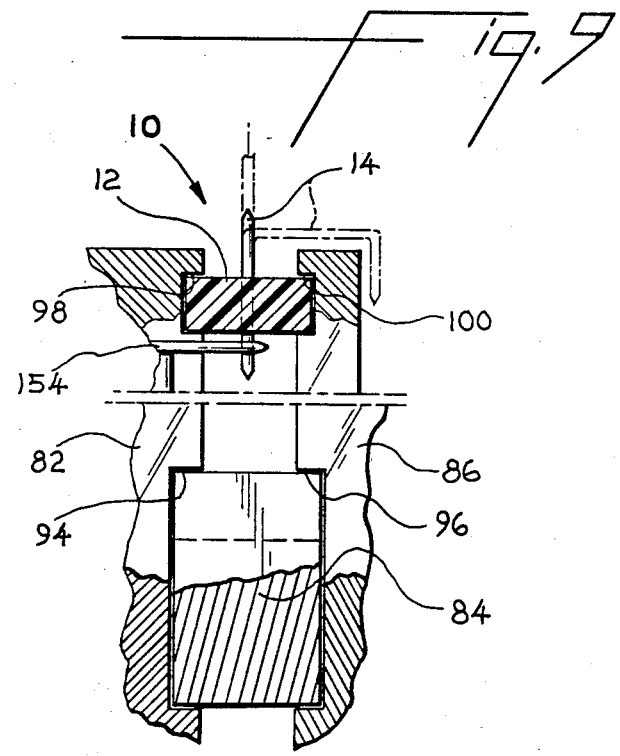
FIG. 9 is an enlargement of a portion of FIG. 8.

As can be seen, for example, in FIGS. 5 and 9, a typical terminal pin assembly or strip 10 includes longitudinal thermoplastic bar 12 with transverse metal terminal pins 14 embedded therein at regular intervals along the length of the bar. Terminal pins 14 typically project from the top and bottom of thermoplastic bar 12, and although the bottom projections are typically straight, the top projections may have any of several shapes as suggested in phantom lines in FIG. 9. For example, the top projection of each terminal pin 14 may be straight, bent at a right angle in a plane perpendicular to the longitudinal axis of bar 12, or bent in a U shape in the plane perpendicular to the longitudinal axis of bar 12.

The apparatus 20 for separating or subdividing terminal pin assembly 10 into predetermined lengths includes a base 22 and the following assemblies mounted on the base: drive assembly 30, skiver blade supporting assembly 50, and terminal strip supporting assembly 80. Stop assembly 120 is mounted on assembly 80. Removable housings 140 (shown in broken lines) may be placed over the various portions of the apparatus including moving parts for increased safety of operation.

Drive assembly 30 includes a prime mover 32 such as a conventional electric motor. When energized by a signal from a suitable control switch, such as a conventional foot switch (not shown), prime mover 32 causes drive wheel 34 to rotate 360° starting from the position shown in FIG. 1. Prime mover 32 is controlled so that one and only one complete revolution of drive wheel 34 occurs in response to each actuation of the control switch.

Drive wheel 34 is operatively connected to skiver blade 52 by drive rod 36. Accordingly, each revolution of drive wheel 34 causes skiver blade 52 to reciprocate once from the starting position shown in FIG. 1 to the fully extended position shown in FIGS. 2 and 3 (the "forward stroke" of skiver blade 52) and then back to the FIG. 1 starting position (the "return stroke" of skiver blade 52).

Skiver blade 52 is disposed in a longitudinal aperture 54 (FIG. 5) in supporting structure 56. As can be seen, for example, in FIG. 5, the clearances between the top, bottom, and side surfaces of blade 52 on the one hand and the adjacent inner surfaces of aperture 54 on the other hand are just large enough to allow blade 52 to reciprocate as described above. Thus blade 52 is securely supported and guided by support structure 56. Support structure 56 is keyed to base 22 by means of the projection of a downward extension of support structure 56 into base slot 24. Slot 24 is parallel to the axis of reciprocation of blade 52.

Terminal strip supporting assembly 80 is oriented at right angles to the axis of reciprocation of skiver blade 52. Assembly 80 is made up of two parts which are separable from one another along a plane perpendicular to the skiver blade axis. The first or stationary part 82 of assembly 80 is to the rear of spacer bar 84 as viewed in FIGS. 1 and 2. This portion of assembly 80 is keyed to base 22 by the projection of a downward extension into base slot 26. Slot 26 is perpendicular to slot 24. The stationary part 82 of assembly 80 is rigidly connected to skiver bade supporting structure 56.

Figure 1:
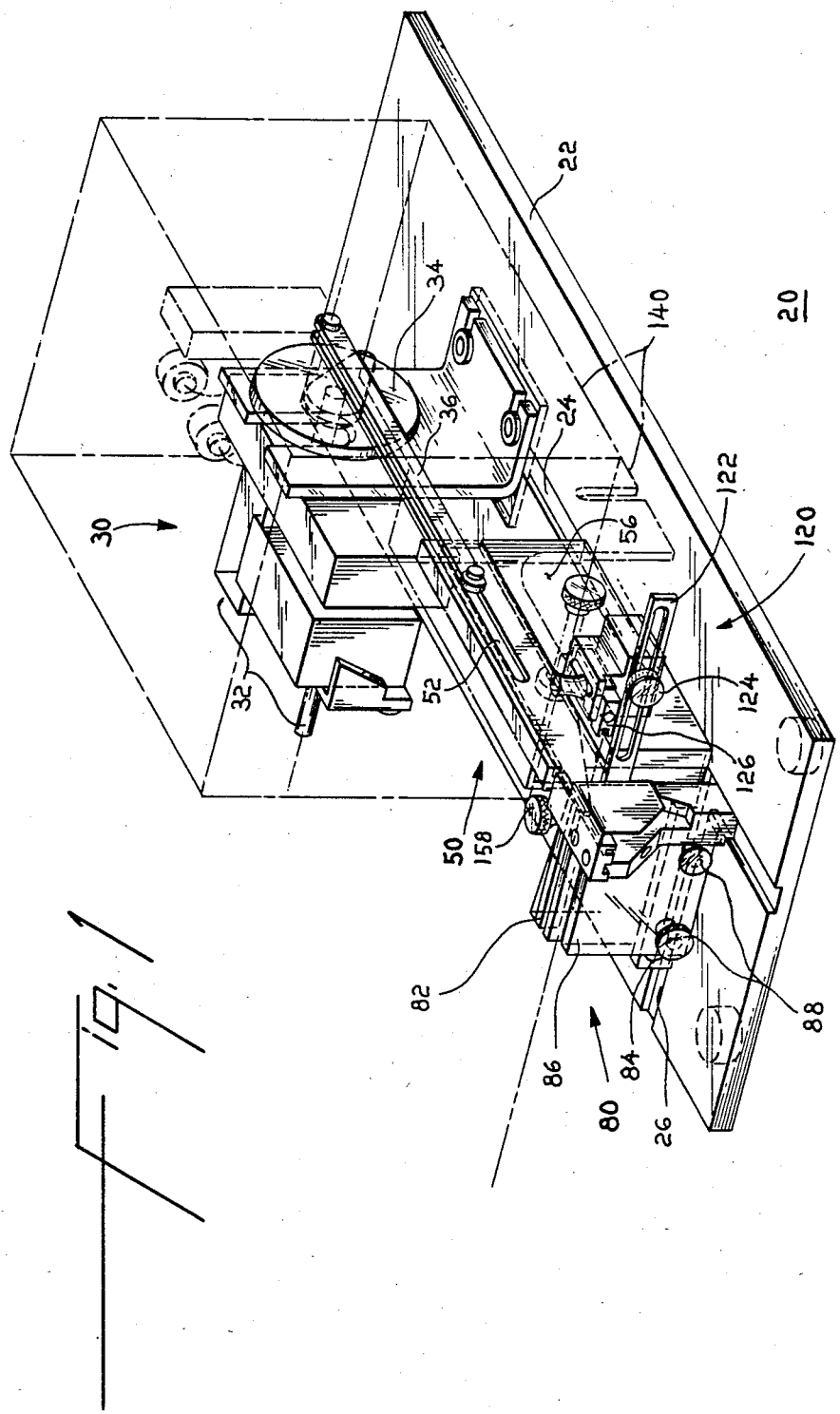
FIG. 1 is a perspective view of an illustrative embodiment of the invention.
Figure 8:
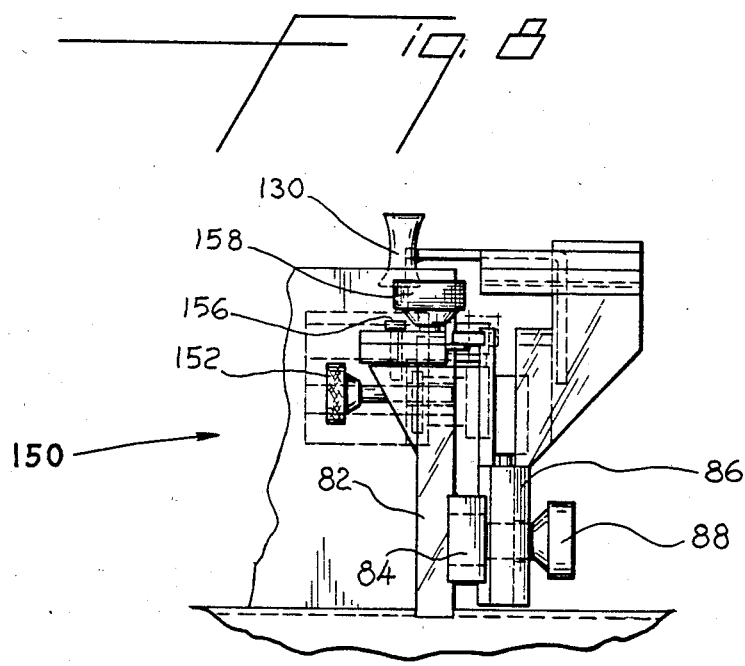
FIG. 8 is a partial elevational view taken along the line 8—8 in FIG. 7.

The second or movable part 86 of terminal strip supporting assembly 80 is in front of spacer bar 84 as viewed in FIGS. 1 and 2. Movable part 86 is secured to stationary part 82 by two thumb screws 88 which extend through movable part 86 and spacer bar 84 into stationary part 82. Accordingly, the spacing between stationary part 82 and movable part 86 can be adjusted to accommodate terminal pin strips of various widths by inserting a spacer bar 84 of appropriate thickness between parts 82 and 86. As is best seen in FIG. 9, spacer bar 84 fits snugly into opposing slots 94 and 96 in parts 82 and 86. This provides the proper vertical registration of part 86 relative to part 82. Part 86 does not bear on base 22 (see FIG. 8).

When the proper spacer bar 84 is in place and when thumb screws 88 are tightened, the spacing between the upper portions of parts 82 and 86 is preferably just large enough to permit insertion of the terminal pin strip to be separated into opposing slots 98 and 100 in parts 82 and 86 (see FIG. 9). In this way supporting structure 80 securely supports the terminal strip during broaching by skiver blade 52.

The movable part 86 of supporting assembly 80 includes upper and lower skiver blade guide slots 90 and 92 (FIG. 5) for supporting and guiding skiver blade 52 on the side of the terminal pin strip remote from skiver blade supporting assembly 50. Guide slots 90 and 92 are axially aligned with aperture 54, and each is approximately the same width as aperture 54, i.e., just wide enough to admit skiver blade 52. Guide slots 90 and 92 therefore maintain the portion of cutter blade 52 which has passed through the terminal pin strip in proper alignment and thereby assure that the terminal pin strip is cut squarely. Guide slot 92 is also preferably deeper than the vertical dimension of thermoplastic bar 12 so that on each side of the path of skiver blade 52 the entire thickness of bar 12 bears against the face of terminal strip supporting assembly part 86. This substantially reduces burring on the side of bar 12 along which skiver blade 52 exits from the bar.

The right-hand end of the terminal pin strip as viewed in FIG. 1 can be pushed against stop assembly 120. Stop assembly 120 is mounted on arm 122 which projects from terminal strip supporting assembly 80 parallel to slot 26. When thumb screw 124 is loosened, stop assembly 120 is movable to any position along arm 122 to allow any desired length of terminal pin strip to extend from the location of skiver blade 52 to stop assembly 120. Stop assembly 120 is fixed at the desired location by tightening thumb sqrew 124. This allows stop assembly 120 to be used to determine the finished terminal pin strip lengths produced by the apparatus.

The component of stop assembly 120 against which the end of the terminal pin strip bears is stop block 126. As is best seen in FIG. 5, the surface of stop block 126 facing skiver blade 52 is recessed at 128 adjacent the end of the thermoplastic bar 12 of terminal pin strip 10 so that the right-hand-most terminal pin 14 (not the end of thermoplastic bar 12) bears on stop block 126. This assures that skiver blade 52 broaches terminal pin strip 10 at a predetermined distance from the right-hand-most terminal pin 14, the location of which is always well defined and less subject to variation and/or error than the location of the right-hand end of thermoplastic bar 12.

To prevent terminal pin strip 10 from moving away from stop assembly 120, pawl assembly 150 is mounted on the stationary part 82 of terminal pin strip supporting assembly 80. Pawl assembly 150 is movable along part 82 parallel to slot 26 and is fixed at the desired position by tightening thumb screw 152. Pawl assembly 150 includes pawl 154 pivotally connected to the remainder of assembly 150 by pin 156. Pawl 154 is resiliently biased to pivot clockwise about pin 156 as viewed in FIG. 7 by means of a spring (not shown). The right-hand end of pawl 154 as viewed in FIG. 7 projects into the path of terminal pins 14 below thermoplastic bar 12 (see also FIG. 9). The end of pawl 154 is shaped so that a terminal pin moving from left to right as viewed in FIG. 7 can deflect pawl 154 and thereby pass the end of the pawl. However, once the terminal pin has passed pawl 154 and the pawl has sprung back move back (from right to left) past the end of the pawl. In use, pawl assembly 150 is positioned so that the end of pawl 154 is between two terminal pins 14 when the end of the terminal pin strip is against stop assembly 120 and so that pawl assembly 150 tends to hold the end of the terminal pin strip against the stop assembly. If it becomes necessary to release terminal pin strip 10 from the apparatus, knob 158 facilitates pivoting pawl 154 out of the terminal pin path.

The skiving portion of skiver blade 52 is shown in detail in FIGS. 3 and 4. The leading edge 58 of blade 52 is tapered to facilitate entry of the blade into guide slots 90 and 92. Just below leading edge 58 is a steeply inclined edge portion 60 which slopes downwardly toward the rear of blade 52. Immediately to the rear of edge portion 60 is downwardly facing horizontal edge portion 62. Terminal strip supporting assembly 80 supports the terminal pin strip so that horizontal edge portion 62 traverses terminal pin strip 10 just above the top surface of thermoplastic bar 12. In this way, horizontal edge portion 62 helps to hold down and stabilize terminal pin strip 10 as the skiving of thermoplastic bar 12 begins.

To the rear of horizontal edge portion 62 is a plurality of upwardly extending recesses 64 in blade 52. Each of recesses 64 is separated from the next-rearward recess by a downwardly projecting tooth 66. The leading edge 68 of each tooth 66 is a skiving edge which is inclined upwardly and to the rear. In the depicted preferred embodiment all of skiving edges 68a-j are inclined approximately 15° to the rear from the vertical. Skiving edge 68k is inclined approximately 30° to the rear from the vertical.

The bottom edge 70 of each tooth 66 is horizontal. The first of edges 70a is slightly below horizontal edge 62 and also slightly below the top surface of thermoplastic bar 12. As a result, the first skiving edge 68a skives a shallow groove in the upper surface of bar 12 as blade 52 is reciprocated forwardly. The groove skived by skiving edge 68a is preferably relatively shallow (e.g., approximately 0.005 inches deep) to minimize the resulting burring of bar 12 on each side of the groove. The relatively small amount of rearward incline (e.g., 15°) of skiving edge 68a also helps prevent raising burrs alongside the groove.

The bottom edge 70b of tooth 66b is slightly below the bottom edge 70a of tooth 66a, and the bottom edge of each succeeding tooth in the rearward direction is similarly slightly below the bottom edge of the preceding tooth. Accordingly, each successive skiving edge 68b, c, d, etc., skives slightly deeper into bar 12 until the bar is finally completely severed by final skiving edge 68k. The first few skiving increments are preferably relatively shallow to help prevent burring along the upper edge of the groove being skived until the groove is sufficiently deep that larger skiving increments can safely be used. For example, in the depicted preferred embodiment edge 70a is approximately 0.005 inches below edge portion 62, and edge 70b is approximately the same distance below edge 70a. Each of edges 70c-j is approximately 0.010 inches below the preceding edge. Edge 70k is approximately, 0.015 inches below edge 70j, and skiving edge 68k is less nearly vertical than the preceding skiving edges so the material of bar 12 adjacent blade 52 is not pushed downwardly to form burrs as final skiving edge 68k passes through bar 12.

The material gouged from bar 12 by each successive skiving edge 68 tends to curl up into the preceding recess 64 and is carried forward by blade 52 through terminal strip supporting assembly 80 where it is free to drop from the blade. Although these pieces of debris are small, they are much larger and easier to keep separated from the finished terminal pin strips than the extremely small particles produced by the high speed saws used in some prior art devices.

As noted above, when final skiving edge 68k has passed through thermoplastic bar 12, the thermoplastic bar has been completely broached. The finished length of the terminal pin strip against stop assembly 120 can be released from the stop assembly by pushing stop block 126 to the rear by means of knob 130. This allows the finished length of terminal pin strip to drop down out of the way. Stop block 126 is resiliently biased in the forward direction by springs. When skiver blade 52 completes its return stroke, the remainder of the terminal pin strip can be advanced through terminal strip supporting assembly 80 and against stop assembly 120. The apparatus is thereby made ready to sever the next length of terminal pins.

It should be noted that unlike a saw blade, skiver blade 52 has no tooth set, no tooth rake, and no hollow ground sides. On the contrary, all of teeth 66 are in the plane of skiver blade 52, all of skiving edges 68 are perpendicular to the plane of skiver blade 52, and the two lateral sides of skiver blade 52 are completely parallel to one another. Burring of thermoplastic bar 12 is minimized by these and other previously described characteristics of skiver blade 12. In addition, burring does not occur on the side of bar 12 along which skiving edges 68 first enter the bar. Nor does burring occur on the opposite side of bar 12 from which skiving edges 68 emerge because that side of the bar if fully supported by supporting structure part 86 as described in detail above. Accordingly, the apparatus produces cleanly broached, burr-free finished pieces.

We claim:

1. Apparatus for broaching terminal pin strips, including laterally extending terminal pins embedded in and spaced along the longitudinal axis comprising:
   a longitudinal, planar skiver blade;
   means for reciprocating the skiver blade parallel to its, longitudinal axis; and
   means for supporting the terminal pin strip so that the longitudinal axis of the bar is perpendicular to the plane of the blade, the blade having a plurality of skiving edges, each of which skives progressively deeper into the bar as the blade is reciprocated toward the terminal pin strip so that the bar is completely severed by the blade after a single reciprocation of the blade.

2. The apparatus defined in claim 1 wherein the means for supporting the terminal pin strip allows the terminal strip to slide parallel to the longitudinal axis of the bar.

3. The apparatus defined in claim 2 further comprising:
   stop means for cooperating with the means for supporting the terminal pin strip for stopping the sliding of the terminal pin strip when a predetermined length of the terminal pin strip is located on one side of the plane of the blade.

4. The apparatus defined in claim 3 wherein the stop means contacts a terminal pin to stop the sliding of the terminal pin strip.

5. The apparatus defined in claim 4 wherein the distance of the stop means from the blade is adjustable.

6. The apparatus defined in claim 3 further comprising pawl means for engaging the terminal pins on the side of the blade remote from the stop means, the pawl means allowing the terminal pins to move past the pawl means only in the direction toward the stop means.

7. The apparatus defined in claim 6 wherein the distance of the pawl means from the blade is adjustable.

8. The apparatus defined in claim 1 wherein the blade is initially disposed on one side of the terminal pin strip, and wherein the means for supporting the terminal pin strip comprises:
   means for supporting the portion of the blade which moves to the other side of the terminal pin strip during reciprocation of the blade.

9. The apparatus defined in claim 1 wherein the blade includes an initial edge portion parallel to its longitudinal axis, and wherein the means for supporting the terminal pin strip supports the strip so that when the blade is reciprocated toward the terminal pin strip, the initial edge portion bears on but does not deform the bar.

10. The apparatus defined in claim 1 wherein each skiving edge is the leading edge of a respective one of a plurality of teeth disposed along one edge of the blade.

11. The apparatus defined in claim 10 wherein each tooth has a bottom surface parallel to the longitudinal axis of the blade, the bottom surface of each successive tooth in the rearward direction being slightly below the bottom surface of the preceding tooth.

12. The apparatus defined in claim 11 wherein the first skiving edge to contact the bar skives a relatively shallow groove in the bar.

13. The apparatus defined in claim 12 wherein the groove skived by the first skiving edge is approximately 0.005 inches deep.

14. The apparatus defined in claim 12 wherein each of at least some of the skiving edges after the first skiving edge increases the depth of the groove by an increment greater than the depth of the groove skived by the first skiving edge.

15. The apparatus defined in claim 14 wherein each increment is approximately 0.010 inches.

16. The apparatus defined in claim 14 wherein the final skiving edge broaches the bar.

17. The apparatus defined in claim 16 wherein the bottom surface of the final tooth is approximately 0.015 inches below the bottom surface of the immediately preceding tooth.

18. The apparatus defined in claim 11 wherein each skiving edge is inclined rearwardly in the direction away from the bottom surface of the tooth.

19. The apparatus defined in claim 18 wherein at least the first skiving edge to contact the bar forms an angle of approximately 75° with the bottom surface of the associated tooth.

20. The apparatus defined in claim 18 wherein at least the last skiving edge to contact the bar forms an angle of approximately 60° with the bottom surface of the associated tooth.

21. The apparatus defined in claim 1 wherein each skiving edge is perpendicular to the plane of the blade.

22. The apparatus defined in claim 1 wherein the sides of the blade transverse to the longitudinal axis of the bar are parallel to one another.

* * * * *

UNITED STATES PATENT OFFICE
CERTIFICATE OF CORRECTION

PATENT NO. : 4,589,188
DATED : May 20, 1986
INVENTOR(S) : Timothy W. Houtz; Charles M. Lovendusky It is certified that error appears in the above-identified patent and that said Letters Patent are hereby corrected as shown below:

Column 6, line 21, insert -- of a thermoplastic bar, into predetermined lengths -- after the word "axis".

Signed and Sealed this

Second Day of September 1986

[SEAL]

Attest:

Attesting Officer

DONALD J. QUIGG

Commissioner of Patents and Trademarks